May 22, 1951     A. C. KORTE     2,553,857
FUEL PUMP MOUNTING WITH SUPPORT FOR DELIVERY TUBE
Filed July 5, 1947
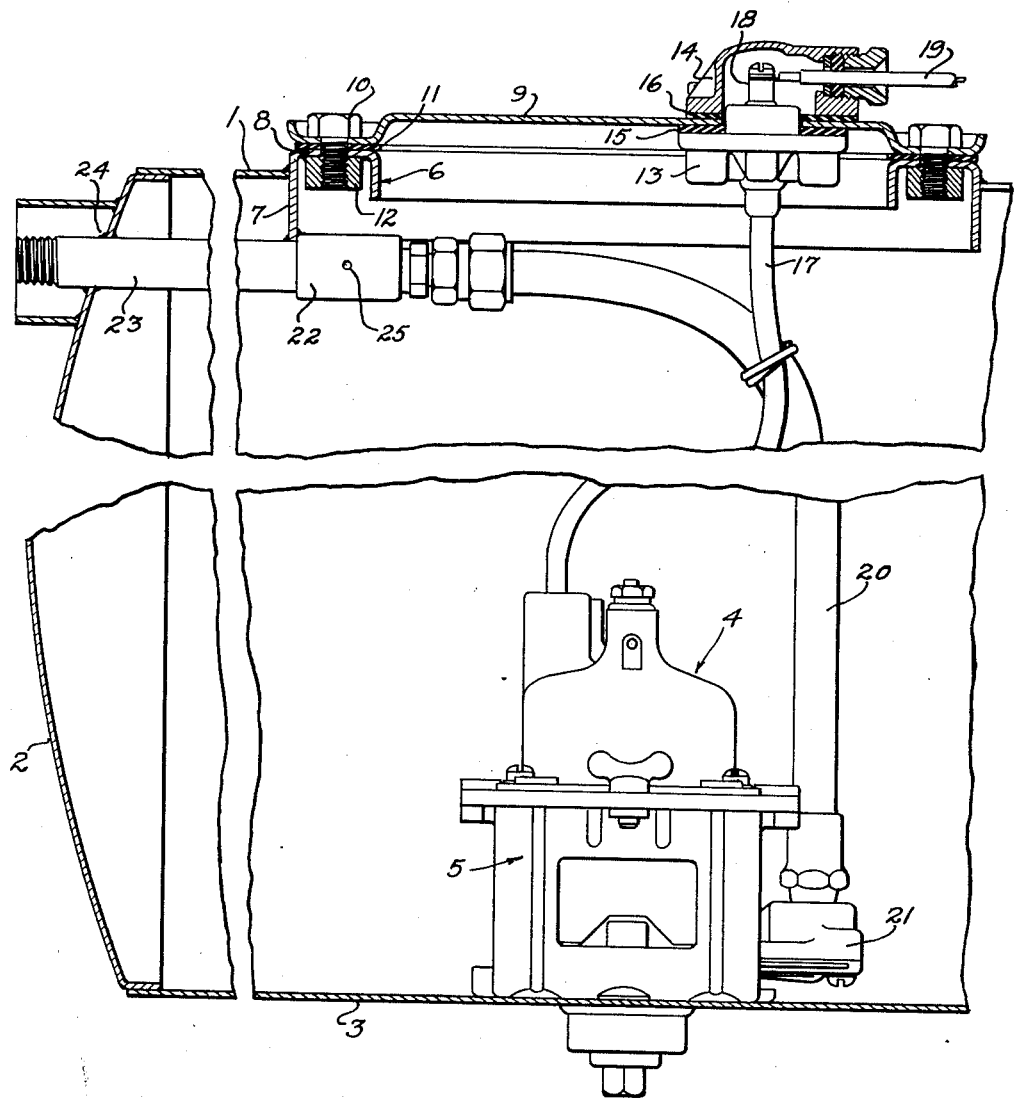
INVENTOR.
ALFRED C. KORTE
BY
ATTORNEY Patented May 22, 1951

2,553,857

UNITED STATES PATENT OFFICE 2,553,857

FUEL PUMP MOUNTING WITH SUPPORT FOR DELIVERY TUBE

Alfred C. Korte, St. Louis, Mo., assignor to Carter Carburetor Corporation, St. Louis, Mo., a corporation of Delaware Application July 5, 1947, Serial No. 759,081

2 Claims. (Cl. 222—385)

This invention relates to mountings for fuel pumps of the type which are carried within the fuel tank and, particularly, to the mounting and support of the operating connections thereof. The electric fuel pump herein disclosed is covered in my Patent No. 2,394,860 and the mount therefor constitutes the subject matter of my copending application, Serial No. 537,552, filed May 27, 1944, now Patent No. 2,424,469 of July 22, 1947. Certain other features herein disclosed are covered in my copending application, Serial No. 628,286, filed November 13, 1945, now Patent No. 2,500,834 of March 14, 1950.

In the last mentioned copending application, both the electrical and fuel delivery connections for the fuel pump are carried by and extend through the detachable cover provided for the opening in the tank wall through which the fuel pump is inserted into the tank. In some cases, however, the fuel delivery connection can better extend through a different portion of the tank wall.

Consequently, it is the main object of the present invention to provide means in connection with the special cover and cover attaching and reinforcing means which stably supports and directs the fuel delivery line extending, for instance, through the tank end wall.

This object and other more detailed objects hereafter appearing are attained by the device illustrated in the accompanying drawing in which the figure is a vertical section through a fuel tank showing an electric fuel pump and operating connections installed therein.

The tank illustrated is of the safety type supplied for use, particularly, with tractors having a "fifth wheel" for operating commercial trailers. The portion of the tank shown includes a top wall 1, end wall 2, and bottom wall 3. An electric fuel pump, generally indicated at 4, is carried by means of a mounting cradle, generally indicated at 5, secured to the bottom wall of the tank.

The top wall of the tank is provided with an opening through which the fuel pump and its mounting are inserted during installation and the edge of this opening is reinforced by a ring 6 of angular cross section as shown. The ring has a vertical leg 7 which is welded to the edge of top wall 1 around the opening mentioned and also has an outer, horizontal flange 8. A cover plate 9 is detachably secured to the ring by means of machine screws 10 extending through the periphery of the cover and a sealing gasket 11 and into a series of nuts 12 on the under side of flange 8.

A pair of castings 13 and 14 are secured, respectively, to the under and top surfaces of the cover plate, with the interposition of sealing gaskets 15 and 16 and accommodate the electrical connection 17 connected by means of a terminal 18 to a wire 19 leading to a source of current. This feature is disclosed in Patent No. 2,500,834.

The fuel delivery tube 20 extends from an outlet fitting 21 at the bottom of the fuel pump upwardly and then laterally and through end wall 2 of the tank. A threaded support coupling 22 is welded to the inner edge of vertical flange portion 7 of the reinforcing ring and receives and supports the delivery tube. A section 23 of the tube connects coupling 22 with the end wall and is welded to the latter as at 24 to provide a seal. The coupling has an anti-siphon bleed hole 25.

The mounting means shown, accordingly, is of such character that it can be readily applied to a fuel tank either during manufacture or in the field by a service mechanic. The operating connections are firmly and durably supported. The disclosure may be modified as will occur to those skilled in the art and the exclusive use of all modifications as come within the scope of the appended claims is contemplated.

I claim:

1. A fuel tank structure including top and end walls, an opening in said top wall, a reinforcing member of annular form sealingly secured to the edge of said opening, said reinforcing member including a flat annular intermediate portion and a depending flange, said depending flange projecting substantially below the top of said tank, a cover having a flat annular marginal portion superimposed upon the medial flat portion of said reinforcing member and secured thereto in sealing relation, the flat annular portion of said cover being offset downwardly, fastening members extending through the offset portion of said cover and said reinforcing member, a fuel pump delivery tube in said tank and projecting through an end wall thereof, a housing secured at the end wall of said tank and enclosing the projecting end of said tube, and a rigid connection between the depending portion of said reinforcing member and a medial portion of said tube.

2. A fuel tank structure including top and end walls, an opening in said top wall of a size to accommodate the insertion of a submerged type fuel pump, a reinforcing member sealingly secured to the edge of said opening, said reinforcing member being of inverted U-form with its outer leg extending downwardly below the inner leg, a cover superimposed upon the medial portion of said reinforcing member and sealed thereto, said cover member including a flanged marginal edge portion and an adjacent flat portion for receiving fastenings therethrough, a fuel pump delivery tube in said tank and extending through and sealingly secured in an end wall, said tube being rigidly secured to the outer annular leg of said reinforcing member, an electric terminal housing sealingly secured to the outer face of said cover plate, and an opening through said cover plate for the passage of an electric connection into said housing.

ALFRED C. KORTE.

REFERENCES CITED

The following references are of record in the file of this patent:

UNITED STATES PATENTS

| Number    | Name         | Date          |
|-----------|--------------|---------------|
| 1,640,722 | Roaten et al.| Aug. 30, 1927 |
| 1,792,827 | Farkas       | Feb. 17, 1931 |
| 2,312,526 | Curtis       | Mar. 2, 1943  |
| 2,370,590 | Taylor       | Feb. 27, 1945 |